United States Patent [19]

Barton et al.

[11] Patent Number: 4,794,341

[45] Date of Patent: Dec. 27, 1988

[54] DIGITAL FILTERS AND DEMODULATORS

[75] Inventors: Stephen K. Barton, Waterbeach Cambridge; Peter M. Terrell, Cambridgeshire, both of England

[73] Assignee: Signal Processors Limited, Cambridge, England

[21] Appl. No.: 926,529

[22] Filed: Nov. 4, 1986

[30] Foreign Application Priority Data

Nov. 5, 1985 [GB] United Kingdom ............... 8527248

[51] Int. Cl.[4] .............................................. H03D 3/18
[52] U.S. Cl. ...................................... 329/50; 329/135
[58] Field of Search .................... 329/50, 135; 375/39, 375/81, 82, 83

[56] References Cited

U.S. PATENT DOCUMENTS 4,528,512  7/1985  Yoshida ................................ 329/50
4,620,159 10/1986  Yoshida et al. ..................... 329/50

FOREIGN PATENT DOCUMENTS 0092400  10/1983  European Pat. Off. .
1523641   9/1978  United Kingdom .
1533773  11/1978  United Kingdom .
2173075A 10/1986  United Kingdom .
WO84/01874 5/1984  World Int. Prop. O. .
WO86/00185 1/1986  World Int. Prop. O. .
WO86/03356 6/1986  World Int. Prop. O. .

OTHER PUBLICATIONS

McVerry, *Performance of a Fast Carrier-Recovery Scheme for Burst-Format DQPSK Transmission over Satellite Channels*, Digital Processing of Signals, In Communications, Loughborough University (Apr. 22-26, 1985): 165-172.

A. J. Viterbi, A. M. Viterbi, *Non-Linear Estimation of PSK-Modulated Carrier Phase with Application to Burst Digital Transmission*, IEEE Transactions on Information Theory, vol. IT-29, No. 4 (Jul., 1983): 543-551.

H. Kobayashi, *Simultaneous Adaptive Estimation and Decision Algorithm for Carrier Modulated Data Transmission Systems*, IEEE Transactions on Communications Technology, vol. COM-19, No. 3 (Jun. 1971): 268-280.

R. J. Sherman, *Quadri-Phase-Shift-Keyed Signal Detection with Noisy Reference Signal*, Eascon '69 Record: 45-52.

K. Feher, *Digital Communications*, Prentice-Hall, 1983. Signal Processors Limited, "QBM 2048 Digital Mode Brochure".

M. Mueller and K. Mueller, "Adaptive Timing Recovery in Digital Synchronous Data Receivers".

*Primary Examiner*—Eugene R. LaRoche
*Assistant Examiner*—Robert J. Pascal
*Attorney, Agent, or Firm*—Lowe, Price, LeBlanc, Becker & Shur

[57] ABSTRACT

A filter, in which digital representations of a signal are stored as samples in a store (8) preferably in the order of their occurrence. Multipliers (9) multiply the samples by coefficients (C1 to C36) representing a function with which the samples are to be convolved. To compensate for the variable time delays in the signal, sets of coefficients representing the function with different time delays are stored. The set to be convolved with the signal is chosen in dependence upon the time delay of the signal. A signal indicative of the time delay is derived from an input to the shift register and fed-forward. The filter is preferably used in a digital demodulator of phase and-/or amplitude modulated signals. The function is then an impulse function defining (at least in part) a desired frequency response of the filter, and the filter corrects the timing of symbols represented by the signal. In the digital demodulator, the symbol timing recovery and correction (4) takes place before carrier phase recovery (5) and demodulation.

22 Claims, 5 Drawing Sheets

DIGITAL FILTERS AND DEMODULATORS

TECHNICAL FIELD

In one aspect the present invention relates to a demodulator for demodulating a signal which is for example Pulse Amplitude Modulated or Quadrature Amplitude Modulated. In another aspect, it relates to digital filters, especially but not exclusively, for use in such a demodulator.

DISCLOSURE OF THE INVENTION

According to one aspect of the present invention, there is provided a demodulator for demodulating a signal the demodulator comprising:

means for producing a digital representation of the modulated signal, a digital symbol timing recovery and correction circuit responsive to the said digital representation for producing a digital signal indicative of symbol timing and for correcting symbol timing in dependence on the indicative signal, and digital demodulation means, responsive to the symbol timing corrected digital representations of the signal to demodulate the the signal.

According to a further aspect there is provided a demodulator for demodulating a signal, the demodulator comprising:

means, for producing a digital representation of the phase modulated signal, and a digital symbol timing correction means, for correcting the timing of the symbols of the digital representation, and means responsive to the signal at the input of the correcting means for deriving, and feeding forward to the correcting means, a signal indicative of symbol timing.

In an embodiment of the said one aspect, the symbol timing correction means includes a digital transversal filter.

Such a digital filter could comprise a shift register which is clocked in such a way as to ensure the symbols are sampled at the appropriate times, but variation in the clocking would result in samples being produced at intervals which also vary.

In accordance with another aspect of the invention there is provided a digital transversal filter in which a digital representation of a signal which is subject to variable time delays is convolved with a predetermined function to effect filtering, the filter comprising means in which the digital samples are stored (e.g. in locations indicative of the time sequence of their occurrence or in locations with which such indicatiON is associated), the symbols are multiplied by respective coefficients representing the function which which they are to be convolved, sets of the coefficients are stored, the sets representing the said function having different time delays, and the set for multiplication with the samples is chosen in dependence upon the time delay of the digital representation of the signal.

Such a filter may be used to correct the symbol timing.

BRIEF DESCRIPTION OF THE DRAWINGS

For a better understanding of the present invention and to show how the same may be carried Into effect, reference will now be made, by way of example to the accompanying drawings, in which.

BEST MODE FOR CARRYING OUT THE INVENTION

Figure 1:
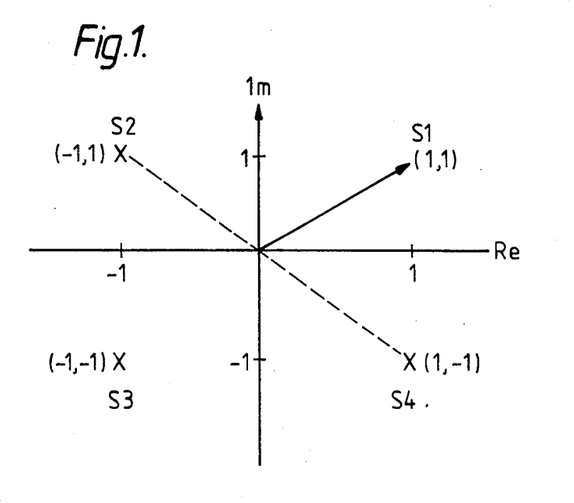
FIG. 1 is a phase vector diagram illustrating a QPSK signal.
Figure 2:
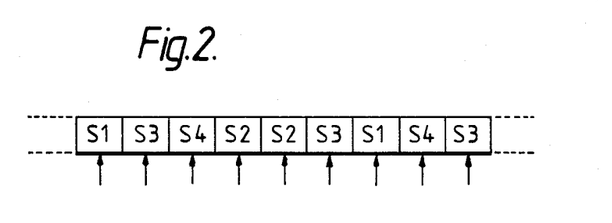
FIG. 2 is a schematic diagram of a QPSK phase modulated carrier.

Referring to FIG. 1, a QPSK (quad phase shift key) signal comprises 4 symbols S1, S2, S3, S4 each of which is represented by a particular phase of a phase modulated carrier signal. In the QPSK signal, the symbols fall within respective quadrants of the phase vector diagram illustrated in FIG. 1. The four symbols S3, S2, S4, S1 represent respective values (Real, 1m; D2,D1) -1-1, -11, 1-1, 11 the pairs of values identifying the quadrants as shown in FIG. 1. As shown schematically in FIG. 2 a carrier is phase modulated with the symbols S1–S4 each symbol occupying a number e.g. one cycle of the carrier. Although FIG. 2 shows abrupt phase transitions between symbols, in fact phase transitions between symbols in the phase modulated signal are not abrupt but follow phase change trajectories. One such trajectory is shown in dotted lines in FIG. 1.

In order to demodulate the QPSK modulated signal it is necessary to perform two functions:

(1) determine the phase of the carrier to determine the phases of the symbols and thus the values of the symbols and (2) determine the timing of the symbols. In conventional analogue demodulators, these functions are performed in the order (1), (2) described above and are performed using phase-lock-loops. The present invention uses no phase-lock-loops.

Assume that the symbol rate is 2M baud.

Figure 3:
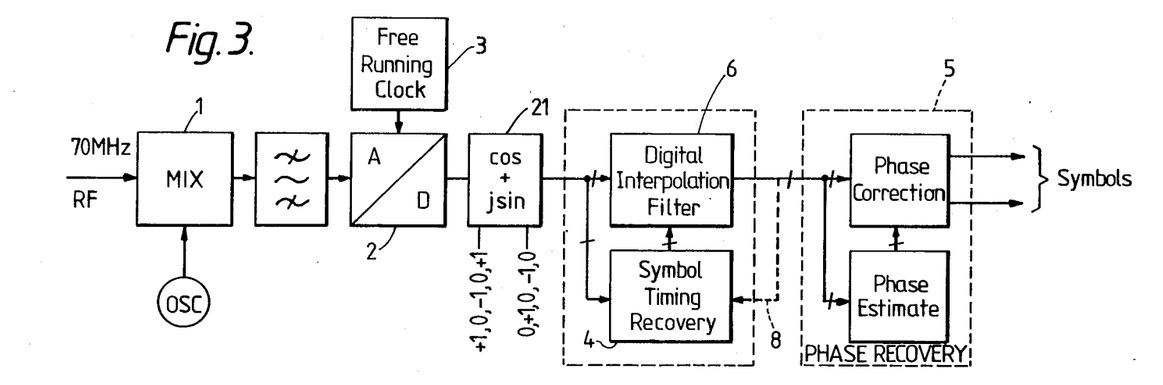
FIG. 3 is a schematic block diagram of a demodulator for demodulating a QPSK signal.

Referring now to FIG. 3, an RF signal of e.g. 70 MHz carrier frequency which is QPSK phase modulated is provided to a mixer where it is mixed with a local oscillator signal of e.g. 68 MHz and band-pass filtered to produce a signal of e.g. 2MBd symbol frequency on a carrier of 2 MHz frequency. The RF signal itself may have been derived from a signal of even higher carrier frequency by a previous mixer (not shown) and band pass filter (not shown) as known in the art.

The resulting (analogue) signal is then sampled and digitised in an analogue to digital converter 2 which is responsive to an 8 MHz sampling clock 3 which produces 4 samples per cycle of carrier. In the case of one symbol per cycle, that is also four samples per symbol. In the embodiment shown in FIG. 3, the clock is free running and so its phase is arbitrary and may vary relative to the incoming signal. The output of the converter 2 is a sequence of digital samples, each in 8 bit parallel form.

The input to, and the output from the converter 2 is a real signal. Subsequent processing however takes place on a complex representation of the signal. For that purpose the digital samples are multiplied in a converter 21 by two signals which convert the samples into their real and imaginary parts corresponding to (cos+jsin)

The two signals are
+1, 0, −1, 0, +1 which corresponds to a cosine function and
0, +1, 0, −1, 0 which corresponds to a sine function.

The two signals are in constant phase and frequency relation with the clock 3.

The output of the converter 21 is in 16 bit (2×8 bit) parallel form where one set of 8 bits represents the real part and the other set represents the imaginary part.

In accordance with one aspect of the present invention, the digital samples are fed to a digital "symbol timing recovery" (STR) circuit 4 which produces a signal indicative of symbol timing, which signal is fed forward to an interpolating filter 6. The timing recovery circuit 4 derives the timing information from the signal provided at the input to the filter 6. Thus, the timing information is fed-forward. Although, in alternative embodiments of the invention, the timing information could be derived by feed-back from e.g. the output of the STR circuit as shown in the dotted line 8 in FIG. 3 or from the output of the phase recovery circuit, feed forward has the following advantages over feed-back:

(1) no error extension during cycle slip; and
(2) no "hang-up" during initial aquisition of symbol timing.

The interpolating filter 6 is a "Nyquist" filter having a variable phase slope controlled by the symbol timing recovery circuit.

If one considers a signal modulated by rectangular pulses, the bandwidth would be excessive. As is known in the art Nyquist defined an optimum filter which gives minimum bandwidth whilst preserving maximum separation between symbols at any one point per symbol. Symbol timing is recovered to ensure that the value at the optimum point is passed to the output of the filter.

The interpolation filter, together with the STR circuit 4 performs the following function:
(a) it provides optimum "Nyquist" filtering;
(b) it corrects for the arbitrary sampling phase in the A/D converter so as to produce the phase/amplitude states as if they had been sampled at the optimum time in the A/D converter 2.

The result is the regeneration, in digital form, of the originally transmitted set of phase/amplitude states, but with an arbitrary rotation of the phase plane.

Figures 4A, 4B:
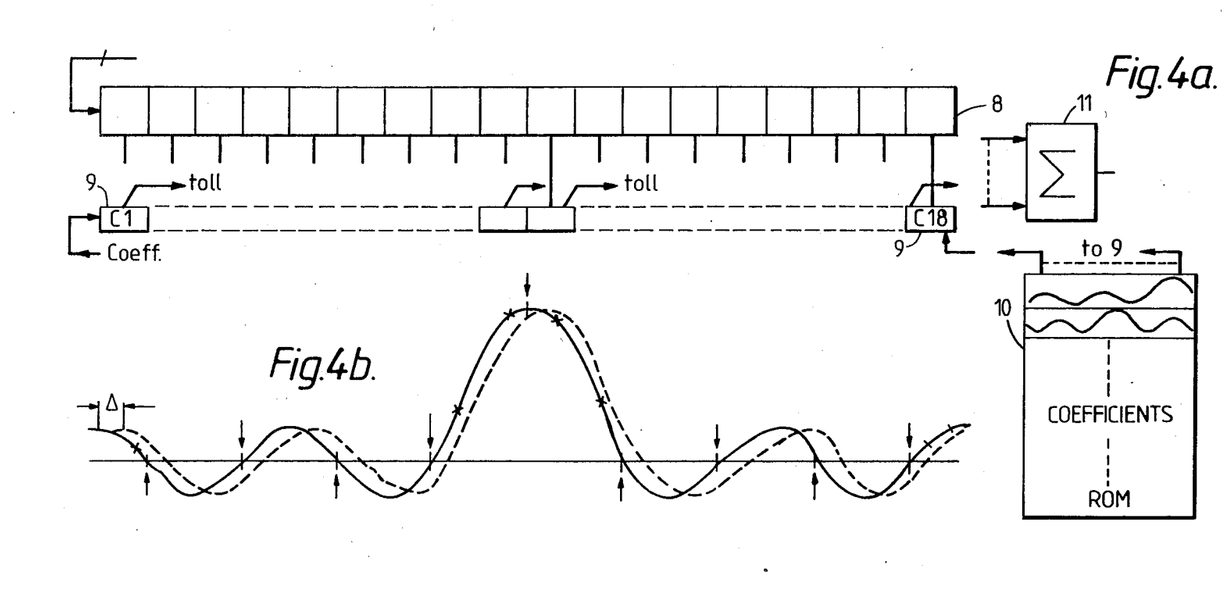
FIGS. 4a–4d are diagrams explaining the operation of the Digital Interpolation filter.

Referring to FIG. 4a, one possible version of a digital filter 6 in accordance with an aspect of the invention is shown. The shown filter is for processing the real parts. It is duplicated for processing the imaginary parts.

The shown filter comprises an 18 stage shift register 8, each stage of which is 8 bits wide to accommodate 8 bit wide samples.

The samples are clocked into and along the shift register 8 at the sample rate of 8 MHz. In FIG. 4a it is assumed that each symbol is represented by 2 samples, the register storing 9 symbols.

Each stage of the register is coupled to an associated multiplier 9 which is also arranged to receive a coefficient from a read only memory 10 (the coefficients ROM) which stores many sets of coefficients. Thus, there are 18 multipliers which receive respective ones of 18 coefficients.

The outputs of the multipliers are summed in an adder 11 which produces samples corresponding to samples of substantially optimum timing.

As is known in the art, the filter convolves the digital signal which is clocked through the shift register 8 with a function represented by the coefficients supplied to the multipliers.

In the filter of the present invention the function represented by the coefficients is chosen to define the Nyquist filtering characteristic of the demodulator (taking into account other filters in the demodulator).

The manner of choosing the coefficients to achieve that function is known in the art and will not be described here.

As shown in FIG. 4b, the coefficients lie on the envelope of a typical impulse response.

It is necessary to align the impulse response with the symbol to be demodulated. The arbitrary timing offset of the sequence of samples representing the symbols must also be taken into account.

Figures 4C, 4D:
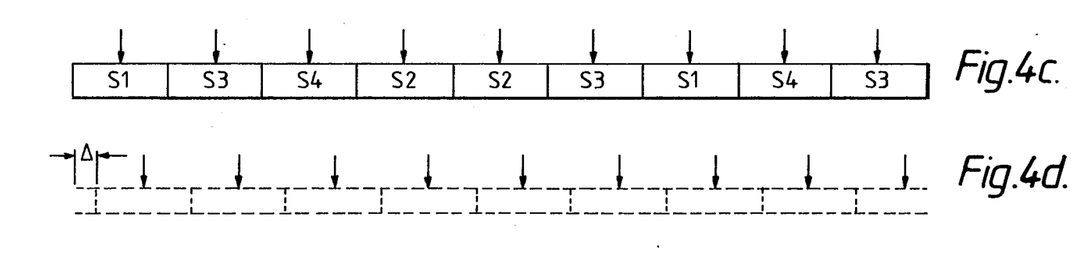

Referring to the solid line symbol sequence in FIG. 4c, the sequence would, ideally, have been sampled at the points indicated by the arrows, and the coefficients chosen from arrowed positions on the solid line curve in FIG. 4b. However, it will be seen from comparison with the shift register that signal samples do not exist at those points. Thus coefficients are chosen from these points X on the impulse response corresponding to the actual sample positions.

In practice, variable propagation delays occur and the timing of the signal in the shift register varies. Also the phase of the sampling clock of the A/D converter relative to the incoming signal is arbitrary.

Referring to the dotted line symbol sequence in FIG. 4d and the dotted line impulse response in FIG. 4b, if the timing of the symbols changes by Δ, the impulse response is the effect shifted relative to the shift register by Δ to compensate. Again coefficients corresponding in position to the positions of the samples in the shift register are chosen.

The choice of coefficients is determined by the output of the signal timing recovering circuit 4.

In accordance with an aspect of the present invention, the coefficients supplied to the multipliers C1–C36 are changed in accordance with the phase shift Δ which has a maximum value of +/− ½ the symbol timing. As shown by the dotted curve in FIG. 4b, the phase shift is compensated for by, in effect, shifting the impulse function by a corresponding amount. That is done by supplying the multipliers with the coefficients which would lie on the shifted impulse response at the positions corresponding to the positions of the multipliers.

Sets of the 18 coefficients are stored in the ROM 10. The set appropriate to any particular phase shift is chosen and read out of the ROM. The number of sets stored is a matter of choice. For example the ROM stores 256×9 samples of the impulse response arranged so that the required 2×9 coefficients can be selected by the output of the STR circuit acting as an address.

Figures 5A, 5B, 5C:
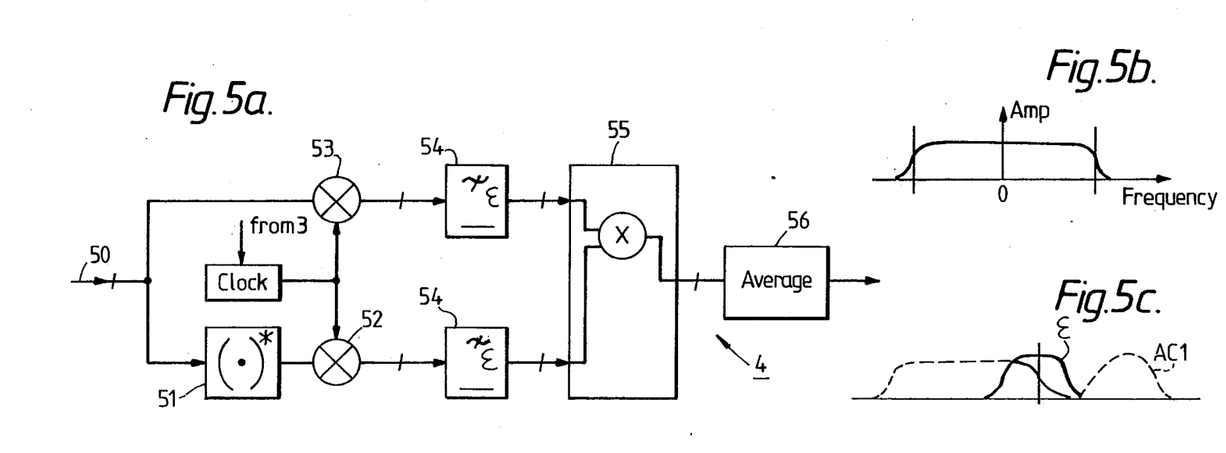
FIG. 5a is a schematic block diagram of an STR circuit for producing a signal indicative of symbol timing.
FIGS. 5b and 5c aid in understanding its operation.

There are many ways known in the art for determining the symbol timing and thus the phase shift Δ. However a preferred manner in accordance with an aspect of the present invention will now be described in the following with reference to FIGS. 5a to 5c. Referring to FIG. 5a, the symbol stream at the input to the digital filter is also fed to an input 50 of the timing symbol recovery circuit 4. The symbol stream is then fed to a circuit 51 which outputs the complex conjugate of its input. The symbol stream is also fed to a mixer 52, and the complex conjugate is fed to another mixer 53. Both mixers also receive a clock signal of frequency equal to one half the symbol rate. The clock signal is derived from the free running clock 3 (FIG. 3) and has a constant phase and frequency relationship with it. The form of the clock signal is 1,j,−1,−j,1, etc.

The outputs of the mixers are provided to two identical filters 54 which select and filter those components of the outputs of the mixers which fall within a common frequency band defined by the filters. The outputs of the filters are multiplied in a circuit 55 which determines the phase of the symbol stream, and an averager 56 averages the phase values over a predetermined number of symbol periods, to produce the signal indicating the symbol timing.

The number of symbol periods over which averaging takes place is chosen to be long enough to ensure that the standard deviation of the phase estimate is reduced to the desired level. The form of the averager is as known in the art.

The manner of operation of the circuit will be described with reference to FIG. 5b. Referring to FIG. 5b, there is shown the signal frequency characteristic centred about zero frequency. The characteristic is flat except at its end zones which are for example raised-cosine shaped. The end zones are skew symmetric about Nyquist frequencies which are spaced from zero by half the symbol frequency. The frequency separation between the Nyquist frequencies in the end zones contain the desired information relating to symbol timing. The clock signal beats both the end zones to a range around zero frequency so that they both fall within the filter frequency response $\epsilon(f)$ of the filter 54 which is also centred around zero frequency. The filter frequency response $\epsilon(f)$ is chosen to pass the respective end zones and to reject adjacent channel interference (ACI) and out of band thermal noise and to reject response to the signals within the remainder of the channel characteristic which would otherwise contribute noise into the symbol time estimate, as beaten down by the clock. By this means the 2 end zones are separately extracted from the signal, and appear at the filter outputs, mapped in frequency to near DC. The complex conjugate operation (51) in the lower arm causes frequency to be negated, so that the lower end zone becomes mapped to the upper end zone (with its spectrum complex conjugated). whence it is mapped to near zero frequency by the clock. The circuit 55 is a multiplier which determines the symbol timing phase with respect to the clock by multiplying the two end zones together in the time domain. This is equivalent to convolution in the frequency domain, and therefore to correlation in the frequency domain between the spectrum of one end zone and the complex conjugate of the other. Because it is well known that the spectrum of the symbol stream is repetitive at an interval equal to symbol frequency, the frequency domain correlation of the end zones will be non-zero at a frequency equal to symbol frequency. Since the end zones have been mapped through twice clock frequency, equal to symbol frequency, the signal emanating from multiplier 55 is the symbol timing phase error in the form of a complex vector $\sigma \cdot \beta^{j\tau}$+noise, where $\tau$=symbol phase error $\sigma$=amplitude. The circuit shown in FIG. 5a has substantial advantages over prior methods of symbol timing recovery in that it allows substantial reduction in computation. These advantages arise for the following reason:

The incoming real and imaginary parts at input 50 can be processed separately and the output of the filters 54 can be worked out for each part. Having determined the response of the top arm to the real part of the input and having also determined the response of the top arm to the imaginary part of the input, it follows that the output of the top arm filter 54 is the sum of the responses and the output of the bottom arm filter is the difference between the responses. That process is very efficient computatically.

Furthermore because the sample rate input to the mixers is twice symbol rate and the clock is $\frac{1}{2}$ symbol rate, the output of each filter 54 is at symbol rate.

Figure 6A:
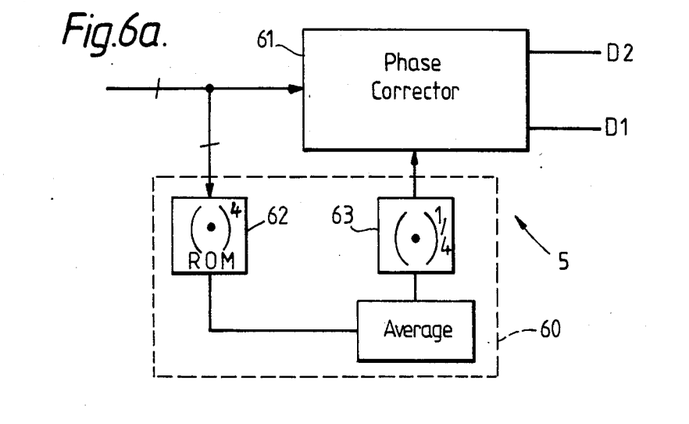
FIG. 6a is a schematic block diagram of a phase recovery circuit.
Figure 6B:
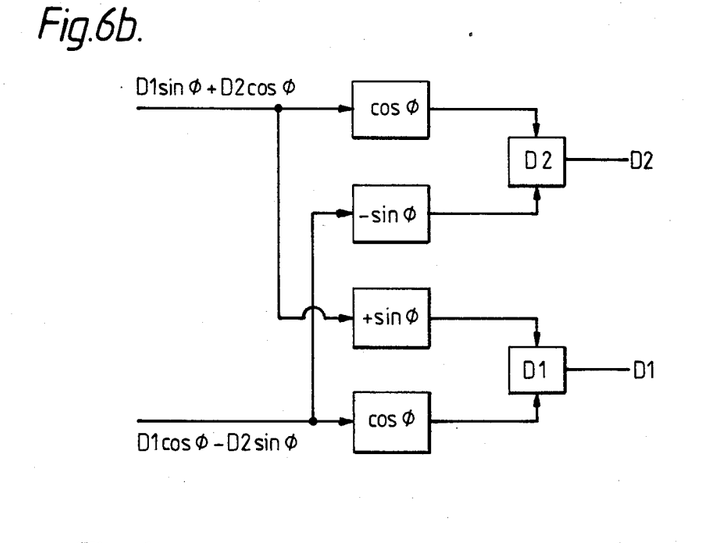
FIG. 6b is a schematic diagram explaining signal processing performed by the phase recovery circuit.

Referring now to FIGS. 6a and 6b, the phase recovery circuit comprises a carrier phase estimating circuit 60 and a phase correcting circuit 61 responsive to circuit 60. The phase recovery circuit rotates the phase plane of the digital signal produced by the symbol timing correction circuit back to its oiginal orientation to recover the transmitted data streams.

The phase estimation circuit takes the symbol stream from the output of the digital filter 6 (FIG. 3) and estimates its phase, the phase estimate being fed forward to the phase corrector. The advantages of feed forward as compared to feed back are:

(1) no error burst extension during cycle slip
(2) no "hang-up".

Figure 6C:
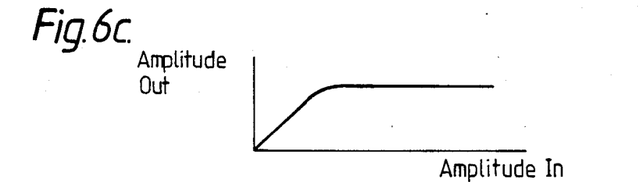
FIG. 6c illustrates a soft limiting characteristic.

The phase estimator 60 comprises a circuit 62 which determines the fourth power of the symbol stream, but with soft limiting (as shown in FIG. 6c) of the resultant amplitude of the output signal, a technique known in the art.

The output of the circuit 62 is averaged over a chosen number of symbol periods to produce a measure of the phase which is then reduced in circuit 63 by the power $\frac{1}{4}$. That measure is used in known manner as shown in FIG. 6b to produce the correct symbol values b1, b2 (see FIG. 1).

The circuits 61 and 63 are preferably ROMs which are addressed by the symbol stream at their inputs so as to read out the corresponding output values.

Because the phase recovery circuit operates on a digital sampled signal the sampling points of which have been optimized it operates more effectively because it does not then respond to the pattern dependent phase trajectories across the phase plane. Although the invention has been described above with reference to an illustrative hardware embodiment, it will be apparent to those skilled in the art that the digital portions thereof may be implemented by program-controlled devices. If the invention is implemented with program-controlled devices, the blocks shown in FIGS. 3 to 6 may no longer represent distinct hardware blocks but instead represent signal processing steps. Those skilled in the art are able to design the devices and write the appropriate programs to carry out the invention.

The digital filter 6 for example may not comprise a shift register 8; instead the digitized samples may be written into memory locations. The multipliers 9 and adder 11 may be implemented by an arithmetic logic unit and accumulator of a computing device which accesses the memory locations and the ROM 10.

Although the invention has been illustrated with reference to demodulating a QPSK phase modulated signal, it is applicable to other sorts of phase modulation schemes involving more or less than four phases e.g. BPSK (bi phase shift key). It is also applicable to signals which are phase and amplitude modulated or to signals which are amplitude modulated. It is, for example, applicable to a QAM (quadrature amplitude modulated) signal or a PAM (pulse amplitude modulated) signal.

Figure 7A:
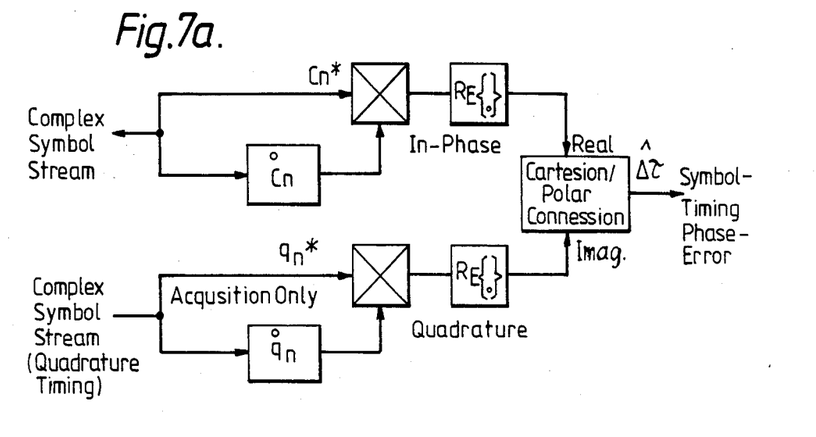
FIGS. 7a and b illustrate, and explain the operation of, an alternative STR circuit.
Figure 7B:
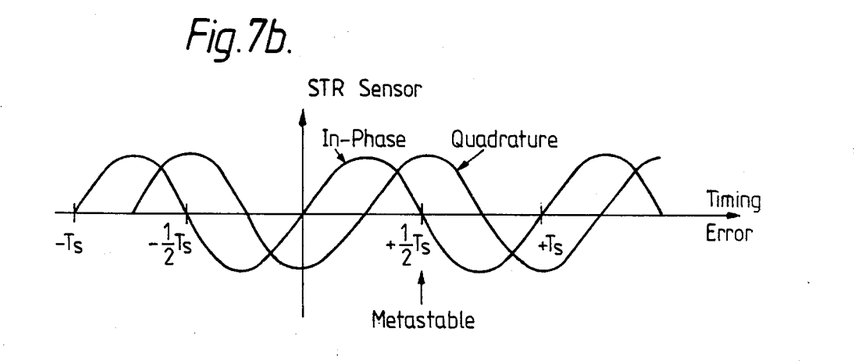

Whilst FIGS. 5a to 5c describe a preferred novel form of STR circuit, another form of an STR circuit is shown in FIGS. 7a to b.

A desirable feature of a STR circuit is that it presents equal and optimal sensitivity through the whole of 360 degrees. A known STR circuit using the maximum likelihood technique does not provide that feature. FIG. 7 discloses a novel symbol-timing-phase-detector with Maximum-Likelihood properties and equal sensitivity for all symbol-timing phase errors. This estimator is a quadrature version of the conventional Maximum-Likelihood symbol-timing-phase estimator. This has the property that at acquisition there is no possibility of hang-up (because the quadrature arm forces the STR system off the metastable point). When steady state operation has been reached, and symbol-timing has been acquired by our demodulator the rms timing-phase error is small; the quadrature arm of the detector is then removed and only the in-phase arm is used. This steady state operation will be recognized as the conventional ML STR. Thus we have a quadrature ML STR system at acquisition with protection against hang-up, and ML STR in the steady state.

We claim:

1. A demodulator for demodulating a phase and/or amplitude modulated signal in which symbols are represented by predetermined phases and/or amplitudes of the signal, the demodulator comprising:
   means, including an analogue-to-digital converter, for sampling the modulated signal with arbitrary phase relative to the symbols and digitizing the samples to produce a digital representation of the modulated signal,
   a digital symbol timing recovery circuit responsive to said digital representation of the modulated signal for producing a signal indicative of symbol timing,
   a digital symbol timing correction circuit responsive to the symbol timing recovery circuit for correcting the symbol timing of the digital representation, the symbol timing recovery circuit being responsive to the signal at the input of the symbol timing correction circuit to derive, and feed forward to the symbol timing correction circuit, the signal indicative of symbol timing, and digital demodulation means, responsive to the symbol time corrected digital representation of the signal to recover the phase of the carrier and demodulate the signal.

2. A demodulator according to claim 1, wherein the symbol timing correction circuit comprises a digital transversal filter, the phase slope of which is variable in dependence upon the signal indicative of symbol timing.

3. A demodulator according to claim 2, wherein the digital transversal filter provides Nyquist filtering.

4. A demodulator according to claim 1, wherein the digital transversal filter comprises means in which the digitized samples forming the digital representation of the signal are stored; the samples are multiplied by respective coefficients representing a predetermined function; and sets of coefficients are stored, the sets representing the same function but with different relative time delays, and the set for multiplication with the samples is chosen in dependence upon the signal indicative of symbol timing.

5. A demodulator according to claim 1 wherein the digital transversal filter includes means for storing a sequence of digitized samples representing the modulated signal,
   means for multiplying the stored samples with a set of coefficients representing a predetermined sampling function,
   means storing sets of said coefficients, the sets representing said function with different relative timing delays, and
   means responsive to the signal indicative of the timing of the symbols to choose the set appropriate to the indicated timing, for multiplication with the stored samples.

6. A demodulator according to claim 5, wherein the said sets of coefficients represent a combination of the same sampling function with different relative time delays, and a Nyquist filtering characteristic.

7. A demodulator according to claim 1, wherein the symbol timing recovery circuit correlates signal components within one skew symmetric end zone of the Nyquist filter characteristic with the complex conjugate of the signal components within another skew symmetric said end zone of said characteristic to produce the signal indicative of symbol timing.

8. A demodulator according to claim 7, wherein the symbol timing recovery circuit comprises
   means for forming the complex conjugate of the digital representation,
   means for selecting said signal components of the digital representation and its complex conjugate, and
   correlating means for correlating the selected signal components of the digital representation and its complex conjugate.

9. A demodulator according to claim 8, wherein the selecting means comprises means for translating the frequencies of the signal components in said end zones to a translated signal with a band of frequencies around a zero frequency and band-pass filter means for passing a band of frequencies around the zero frequency of said translated signal.

10. A demodulator according to claim 7, wherein the symbol timing recovery circuit forms the average of the product of the said signal components of the digital representation and its complex conjugate, to produce said indicative signal.

11. A demodulator for demodulating a modulated signal in which symbols are represented by predetermined phases and/or amplitudes of the signal, the demodulator comprising:
   means, including an analogue-to-digital converter, for sampling the modulated signal with arbitrary phase relative to the symbols and digitizing the samples to produce a digital representation of the modulated signal, a digital symbol timing correction circuit having an input for receiving the digital representation of the modulated signal for correcting the timing of the symbols, and a digital symbol timing recovery circuit, responsive to the signal at the input of the correcting circuit for deriving and feeding forward to the correcting circuit, a signal indicative of symbol timing.

12. A demodulator according to claim 8 wherein the correction circuit comprises a digital transversal filter the phase slope of which is variable in dependence upon the signal indicative of symbol timing.

13. A demodulator for demodulating a modulated signal in which symbols are represented by predetermined phase and/or amplitudes of the signal, the demodulator comprising:

means, including an analogue-to-digital converter, for sampling the modulated signal with arbitrary phase relative to the symbols and digitizing the samples to produce a digital representation of the modulated signal, a digital symbol timing correction circuit having an input for receiving the digital representation of the modulated signal for correcting the timing of the symbols, the correction circuit comprising means in which the digital samples are stored, the samples are multiplied by respective coefficients representing a combination of a predetermined sampling function and a Nyquist filtering characteristic, sets of coefficients are stored, the sets representing the same combination but with different relative time delays, and the set for multiplication with the samples is chosen in dependence upon the signal indicative of symbol timing, and a digital symbol timing recovery circuit, responsive to the signal at the input of the correction circuit, for deriving and feeding forward to the correction circuit a signal indicative of symbol timing.

14. A demodulator for demodulating a phase and/or amplitude modulated signal in which symbols are represented by predetermined phases and/or amplitudes of the signal, the demodulator comprising:

means, including an analogue-to-digital converter, for sampling the modulated signal with arbitrary phase relative to the symbols, and digitizing the samples to produce a digital representation of the modulated signal, a digital symbol timing recovery circuit, a digital symbol timing correction circuit responsive to the symbol timing recovery circuit for correcting the symbol timing of the digital representation, the digital symbol timing recovery circuit being responsive to the digital representation at the input of the correction circuit to produce, and feed forward to the correction circuit, a signal indicative of symbol timing, and digital demodulation means, responsive to the symbol time corrected digital representation of the signal to recover the phase of the carrier and demodulate the signal;

wherein the symbol timing recovery circuit comprises a digital filter for producing said indicative signal the filter being arranged to produce the time average of the product of those components falling within a predetermined frequency response around zero frequency of signals a, b , where a represents the product of the symbols with a reference signal having a frequency one-half the rate of occurrence of the symbols and b represents the product of a complex conjugate of the symbols with the reference signal.

15. A demodulator for demodulating a phase and/or amplitude modulated signal in which symbols are represented by predetermined phases and/or amplitudes of the signal, the demodulator comprising:

means, including an analogue-to-digital converter, for sampling the modulated signal with arbitrary phase relative to said symbols, and digitizing the samples to produce a digital representation of the modulated signal, a digital symbol timing recovery circuit which correlates signal components within one skew symmetric end zone of a Nyquist filter characteristic with a complex conjugate of signal components within another skew symmetric said end zone of said characteristic, to produce a signal indicative of symbol timing, a digital symbol timing correction circuit responsive to the symbol timing recovery circuit for correcting a symbol timing of the digital representation, and digital demodulation means, responsive to the symbol time corrected digital representation of the signal to recover the phase of the carrier and demodulate the signal.

16. A demodulator according to claim 15, wherein the symbol timing recovery circuit comprises:

means for forming the complex conjugate of the digital representation, means for selecting said signal components of the digital representation and its complex conjugate, and correlating means for correlating the selected signal components of the digital representation and its complex conjugate.

17. A demodulator according to claim 16, wherein the selecting means comprises means for translating the frequencies of the signal components in said end zones to a translated signal with a band of frequencies around zero frequency and band-pass filter means for passing said band of frequencies of said translated signal around zero frequency.

18. A demodulator according to claim 15, wherein the symbol timing recovery circuit forms the average of the product of said signal components of the digital representation and its complex conjugate to produce said indicative signal.

19. A symbol timing recovery circuit for producing a signal representing the symbol timing of a signal which is pulse and/or amplitude modulated, the modulated signal being subject to a Nyquist filtering characteristic having skew symmetric end zones, the recovery circuit correlating signal components within one of the skew symmetric end zones of the Nyquist filter characteristic with a complex conjugate of the signal components within the other of the said end zones to produce the signal indicative of symbol timing.

20. A recovery circuit according to claim 19, comprising:

means for producing a digital representation of the modulated signal, means for forming the complex conjugate of the digital representation, means for selecting said signal components of the digital representation and its complex conjugate, and correlating means for correlating the selected signal components of the digital representation and its complex conjugate.

21. A recovery circuit according to claim 20, wherein the selecting means comprises means for translating the frequencies of the signal components in said end zones to a band of frequencies around zero frequency and band-pass filter means for passing said band of frequencies around zero frequency.

22. A recovery circuit according to claim 20, wherein the symbol timing recovery circuit forms the average of the product of the said signal components of the digital representation and its complex conjugate to produce said indicative signal.

* * * * *